United States Patent [19]
Hallerback

[11] 3,767,279
[45] Oct. 23, 1973

[54] FLEXIBLE FLANGE FOR BEARINGS, PREFERABLY ROLLING BEARINGS

[75] Inventor: Stig Lennart Hallerback, Vastra Frolunda, Sweden

[73] Assignee: SKF Industrial Trading and Development Company N.V., Amsterdam W., Netherlands

[22] Filed: Dec. 9, 1971

[21] Appl. No.: 206,329

[52] U.S. Cl. .............................. 308/236, 308/187.1
[51] Int. Cl. ......................... F16c 43/00, F16c 33/78
[58] Field of Search ..................... 308/187.1, 187.2, 308/236; 277/183, 186

[56] References Cited
UNITED STATES PATENTS

| 3,702,720 | 11/1972 | Hallerback | 308/236 |
| 3,658,395 | 4/1972 | Hallerback | 308/187.2 |
| 3,614,183 | 10/1971 | Berens | 308/187.1 |
| 3,519,316 | 7/1970 | Gothberg | 308/187.1 |
| 3,594,050 | 7/1971 | Gothberg | 308/187.2 |
| 3,376,084 | 4/1968 | McKee | 308/187.1 |

Primary Examiner—Charles J. Myhre
Assistant Examiner—Barry Grossman
Attorney—Dexter N. Shaw et al.

[57] ABSTRACT

For use in mounting a ring of a bearing in a housing having an axial end section and a seat for the ring, the ring having a peripheral surface thereof confronting the seat and spaced axially inwardly from one axial end face of the ring, the ring having an axial land surface between the groove and axial end face, a seal assembly comprising a radial portion and an axial portion depending from the inner edge of the radial portion, said radial and axial portion including reinforcing member at least partially imbedded in an outer casing made of elastic material, said reinforcing member having an angle-shaped cross section imbedded in the radial portion of the seal and a section depending from the angle-shaped section, the end of the axial portion of the casing engageable in the groove of the ring, the housing, inner ring and seal being of a predetermined relation so that upon assembly of the seal, a face of the radial portion of the seal is compressed against the axial end section of the housing, the inner radial portion and the axial portion are pressed against the axial land surface of the ring whereby the seal is under radial and axial pressure to effectively prevent creeping of the seal.

4 Claims, 6 Drawing Figures

Patented Oct. 23, 1973 3,767,279

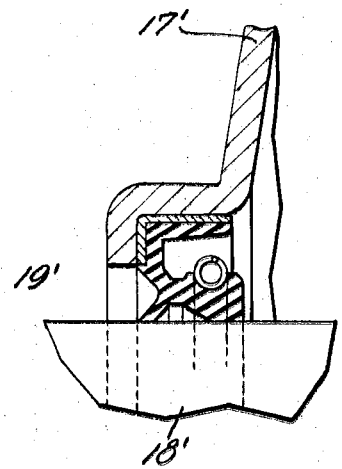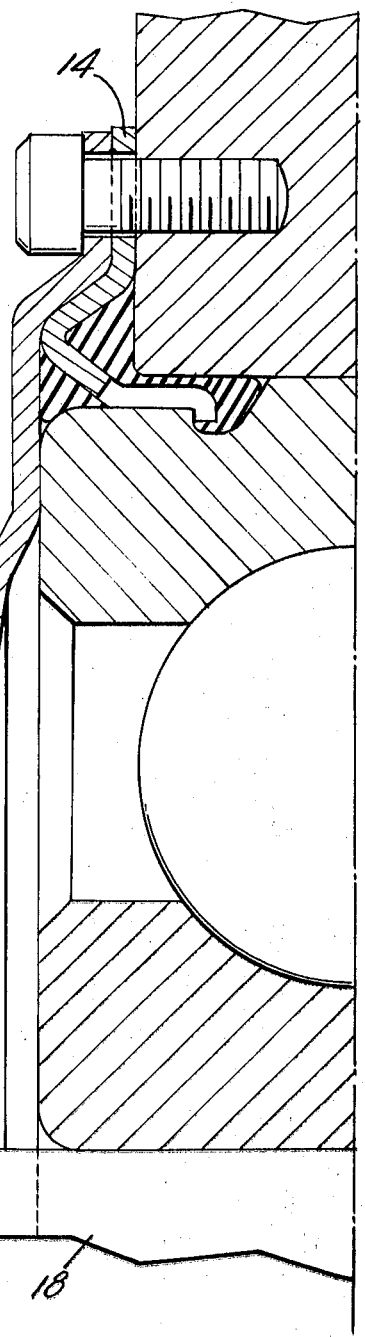

FLEXIBLE FLANGE FOR BEARINGS, PREFERABLY ROLLING BEARINGS

In order to reduce the manufacturing costs in certain bearing applications, the flange fixed to, for instance, the outer ring of a rolling bearing is replaced by a divided flange ring snapped into a groove turned in the outer bearing ring. It has occurred, however, that certain disadvantages have been noticed in doing so since the flange ring groove performed by a turning operation has so small inner radii that they by themselves give rise to serious fracture indications which could result in broken outer rings. Furthermore, the outer ring has a tendency to creep in the bearing seat. Dependent on the design of the application unit, it is not possible to arrange axial abutments so that a pressure is obtained on the flanges which means that the bearings could move axially up to 0.5 millimeters. The flange ring snapped on the bearing has, like the outer ring of the bearing, a tendency to creep and to wear on the axial contact surface.

In order to avoid these disadvantages, there has been proposed some changes regarding this bearing type: the flange ring groove is made broader so that a greater radius is obtained at the place for the critical fracture indication and the additional space obtained between the flange ring snapped on, the bearing ring and the bearing seat serves as a space for an O-ring which in mounted position in the bearing seat is compressed by means of the bearing housing so that a certain creeping-hampering effect is obtained.

The present invention relates to a flange which is effectively creeping-hampering and which at the same time easily could be mounted in the groove of the outer ring. In accordance with the invention the flange consists of an elastic material fixed to a rigid member intended to be snapped into a groove in the periphery of the bearing outer ring by means of its central portion. The elastic material has such dimensions that the flange after the mounting of the bearing and the flange in the bearing housing is compressed between the bearing housing and the outer ring.

The invention will now be described with reference to the accompanying drawings which show one embodiment in accordance with the invention.

Figure 3:
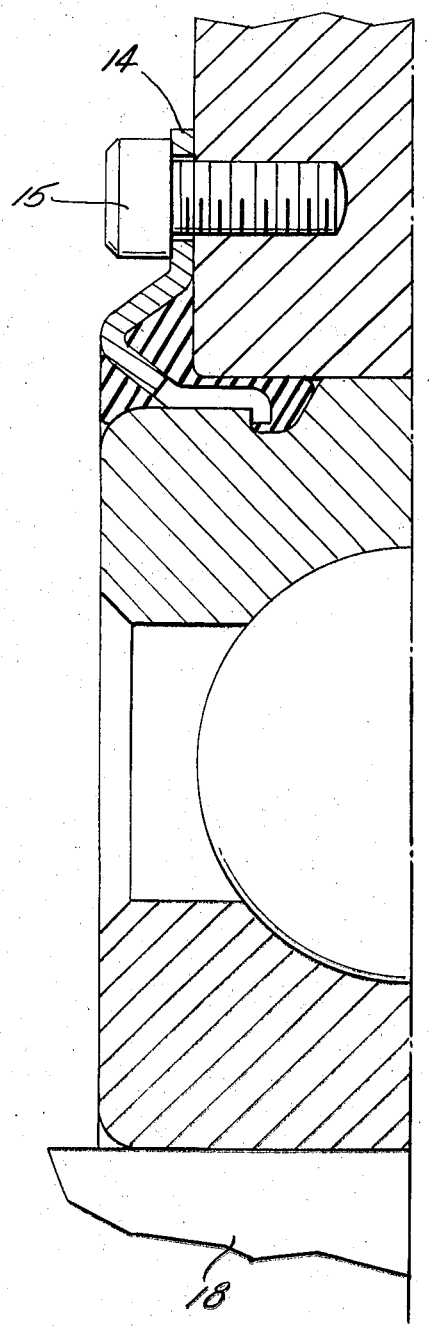
Figure 4:
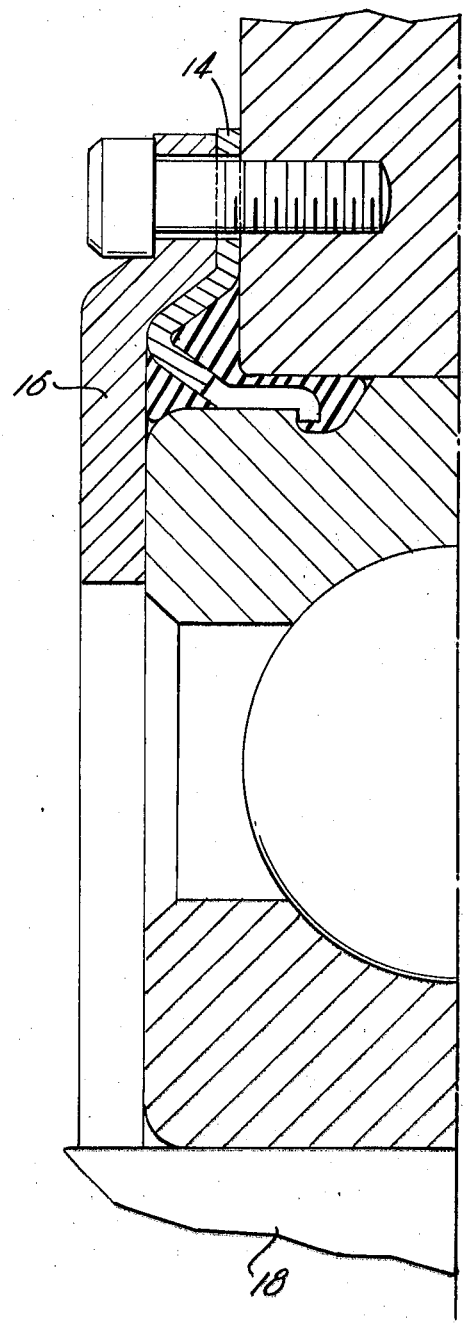

FIG. 3 shows a modification in which the rigid member is provided with an outwardly directed flange or ears through which the flexible flange in accordance with the invention could be connected with the bearing housing, for instance by means of screws of which one is shown in FIG. 3; and FIGS. 4 and 5 show modifications in which the flexible flange cooperates with an outer washer which in the embodiments shown has a central bore for a through shaft and in FIG. 5 is shown a sealing ring arranged between the shaft and the washer.

Figure 1:
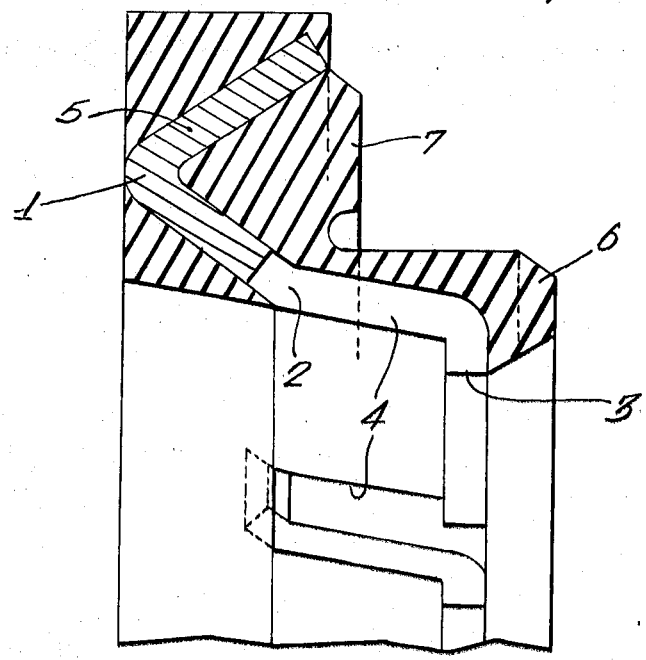
FIG. 1 shows a section through a flange in accordance with the invention.

FIG. 1 shows a rubber flange fixed to a member 1 which could be made from pressed sheet metal. This member is towards center bent to a slightly conical shape as shown at 2 and ends in a smaller turned flange 3. The conical portion like the central flange has a number of slots 4.

Figure 2:
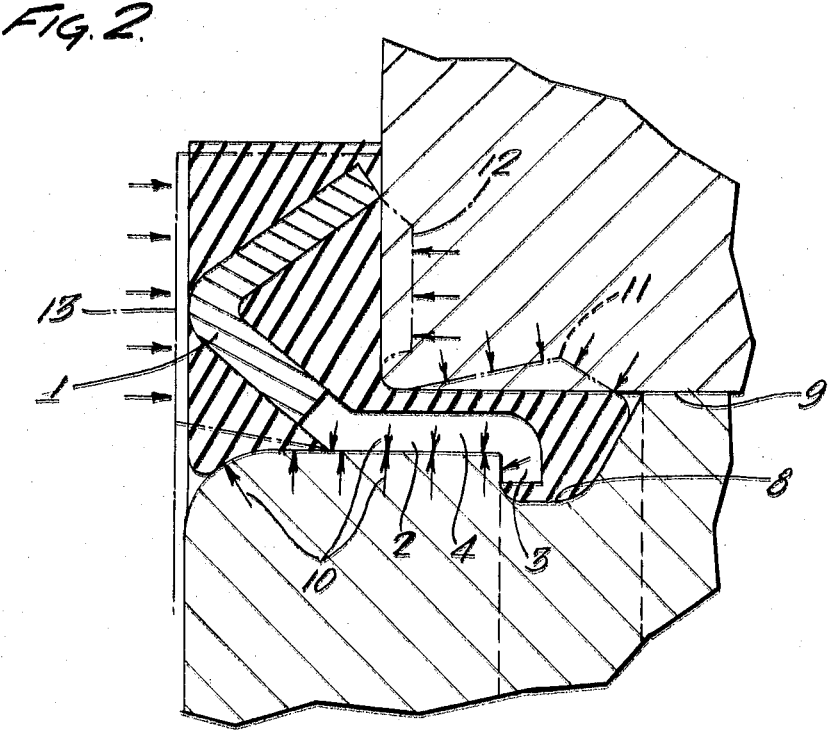
FIG. 2 shows the flange mounted on a partially indicated outer ring of a bearing fitted into a bearing housing not shown here.

A part of the outer flange portion has an angle shape as shown at 5. The sheet metal member is embedded in rubber in such a manner that it before mounting has a greater volume than the space intended to receive the flange between the bearing housing, the outer ring and a possible cover located outside the bearing and the bearing housing. After the mounting of the flange, the rubber is compressed in the last mentioned space. The parts indicated by 6 and 7 will be more compressed than the other parts. During the mounting the conical, central portion 2 of the flange is flared and its inner flange 3 is snapped into a groove 8 in outer ring of the bearing, vide FIG. 2. When the bearing and the flange afterwards are fitted into the bearing seat 9 and if necessary are pressed against the housing by means of an outer cover, the rubber flange gets a shape as shown in FIG. 2. The rubber portion 11 which earlier projected outside the periphery of the bearing is now pressed against the bearing ring and fills partly up the space formed at the groove 8 of the bearing ring and the increased space formed when the lugs of the sheet metal member are flared during the mounting. The rubber mass is allowed to be compressed at 12 and at the same time to widen the V-shaped portion of the metal member somewhat if the axial contact surface 13 by means of a cover is pressed against the housing.

The flexible flange shown in FIG. 3 is provided with outer radially outwardly directed flange or ears 14 by means of which it is possible to connect the flange to the bearing housing, for instance by the aid of screws 15. Owing to this the rubber mass is effectively compressed between the bearing housing, the outer ring and the rigid member.

In FIG. 4 there is shown an example in which the flexible flanges cooperate with an outer washer 16 which is attached to the housing in the same manner as the flange.

In FIG. 5 there is shown an embodiment in which a sealing cover 17 together with the flexible flange is connected to the housing in the same manner as the washer in FIG. 4. The cover 17 is provided with a central bore for a through shaft 18 and a sealing device in the form of an elastic member could be fixed to the cover and ride against the shaft 18.

When the flange is mounted in accordance with the above, the whole rubber mass will be under pressure. The sheet metal member embedded in the rubber mass will be means of this be very well supported. A more effective creeping protection compared to a conventional O-ring design is obtained dependent on the fact that large rubber portions are compressed both radially and axially. Compared to the conventional O-ring design in this case it is obtained a creeping-hampering effect only at the arrow-indicated positions 10 which to a high degree surpasses the effect of an O-ring dependent on the large pressure-actuated rubber extension at this part of the outer ring. A further advantage is obtained at such occasions when the bearing is exposed to thrust loads and the radial protection against creeping of the outer ring in relationship to the bearing housing.

The flange does not require a large groove in the outer ring either radially or axially. The risk for fracture is small and a large contact surface between the bearing ring and the seat is obtained.

I claim:

1. For use in mounting a ring of a bearing in a housing having an axial end section and a seat for the ring, the ring having a peripheral surface thereof confronting the seat and spaced axially inwardly from one axial end face of the ring, the ring having a groove on its outer surface and an axial land surface between the groove and axial end face, a seal assembly comprising a radial portion and an axial portion depending from the inner edge of the radial portion, said radial and axial portion including a reinforcing member at least partially imbedded in an outer casing made of elastic material, said reinforcing member having an angle-shaped cross section imbedded in the radial portion of the seal and a section depending from the angle-shaped section, the end of the axial portion of the casing engageable in the groove of the ring, the housing, inner ring and seal being of a predetermined relation so that upon assembly of the seal, a face of the radial portion of the seal is compressed against the axial end section of the housing, the inner radial portion and the axial portion are pressed against the axial land surface of the ring whereby the seal is under radial and axial pressure to effectively prevent creeping of the seal.

2. A seal assembly as claimed in claim 1 wherein the section of the reinforcing member depending from the angle-shaped section is conical and terminates in a radially inwardly directed rib engageable in the groove of the ring and includes a plurality of circumferentially spaced slots.

3. A seal assembly as claimed in claim 1 wherein the angle-shaped cross section of said reinforcing member is V-shaped, the legs of the V opening in an axial direction toward the housing and which upon assembly of the seal effects radial compression of at least a portion of the elastic casing against the land surface of the ring.

4. A seal assembly as claimed in claim 1 wherein the reinforcing member is provided with an outwardly directed radial flange by which the seal assembly may be attached to the housing.

* * * * *